US011202242B2

United States Patent
Levesque et al.

(10) Patent No.: US 11,202,242 B2
(45) Date of Patent: Dec. 14, 2021

(54) LOW POWER SENSOR NODE OPERATION FOR WIRELESS NETWORK

(71) Applicant: Analog Devices International Unlimited Company, Limerick (IE)

(72) Inventors: Alain Pierre Levesque, Pleasanton, CA (US); Lance Robert Doherty, San Leandro, CA (US); Jonathan Noah Simon, Castro Valley, CA (US)

(73) Assignee: Analog Devices International Unlimited Company, Limerick (IE)

( * ) Notice: Subject to any disclaimer, the term of this patent is extended or adjusted under 35 U.S.C. 154(b) by 141 days.

(21) Appl. No.: 15/160,502

(22) Filed: May 20, 2016

(65) Prior Publication Data

US 2016/0345317 A1 Nov. 24, 2016

Related U.S. Application Data

(60) Provisional application No. 62/165,873, filed on May 22, 2015.

(51) Int. Cl.
*H04W 40/02* (2009.01)
*H04W 40/12* (2009.01)
(Continued)

(52) U.S. Cl.
CPC ........... *H04W 40/02* (2013.01); *H04W 40/12* (2013.01); *H04W 72/044* (2013.01);
(Continued)

(58) Field of Classification Search
None
See application file for complete search history.

(56) References Cited

U.S. PATENT DOCUMENTS 7,242,294 B2 * 7/2007 Warrior .............. H04B 7/18506
340/539.22
8,699,377 B2 * 4/2014 Veillette .................. H04L 45/34
370/254
(Continued)

FOREIGN PATENT DOCUMENTS

CN 101247342 A 8/2008
CN 101247414 A 8/2008
(Continued)

OTHER PUBLICATIONS

International Search Report and Written Opinion dated Sep. 1, 2016, issued in International Application No. PCT/US2016/033266.
(Continued)

*Primary Examiner* — Noel R Beharry
*Assistant Examiner* — Rodrick Mak
(74) *Attorney, Agent, or Firm* — Schwegman Lundberg & Woessner, P.A.

(57) ABSTRACT

A wireless mesh network system includes network nodes that operate in blink and canopy modes of operation. In operation, a network manager joins nodes operating in the canopy node to the network and allocates network bandwidth to the canopy nodes. The allocated bandwidth includes a first bandwidth allocated for transmitting and receiving data packets between canopy nodes that are joined to the network, and a second bandwidth allocation for receiving network joining messages from nodes that are not joined to the network. The second bandwidth allocation is also used for receiving data messages from nodes operating in the blink mode. Thus, in response to receiving a message that was transmitted from a blink node to a canopy node using the second bandwidth allocation, the network manager identifies the message as a data message and provides the data from the message to a host application.

20 Claims, 5 Drawing Sheets

(51) Int. Cl.
*H04W 72/04* (2009.01)
*H04W 84/18* (2009.01)
*H04W 84/22* (2009.01)

(52) U.S. Cl.
CPC .......... *H04W 84/18* (2013.01); *H04W 84/22* (2013.01); *Y02D 30/70* (2020.08)

(56) References Cited

U.S. PATENT DOCUMENTS

| | | | |
|---|---|---|---|
| 9,621,457 B2* | 4/2017 | Veillette | H04W 40/246 |
| 9,936,383 B2* | 4/2018 | Ramachandran | H04W 4/70 |
| 2007/0185646 A1 | 8/2007 | Neugebauer et al. | |
| 2007/0206547 A1* | 9/2007 | Gong | H04L 45/122 370/338 |
| 2007/0236346 A1* | 10/2007 | Helal | H04L 12/2803 340/539.22 |
| 2007/0274346 A1 | 11/2007 | Lord | |
| 2008/0273518 A1* | 11/2008 | Pratt | G01D 21/00 370/345 |
| 2008/0310311 A1 | 12/2008 | Flammer et al. | |
| 2009/0010203 A1* | 1/2009 | Pratt, Jr. | H04L 12/66 370/328 |
| 2009/0046675 A1* | 2/2009 | Pratt, Jr. | H04W 84/18 370/337 |
| 2009/0097443 A1 | 4/2009 | Pasanen et al. | |
| 2009/0135716 A1* | 5/2009 | Veillette | G01D 4/004 370/221 |
| 2009/0138713 A1* | 5/2009 | Veillette | G01D 4/004 713/171 |
| 2011/0090809 A1 | 4/2011 | Chen et al. | |
| 2011/0292876 A1 | 12/2011 | Morris | |
| 2013/0071111 A1* | 3/2013 | Yoo | H04Q 11/0067 398/38 |
| 2013/0197955 A1* | 8/2013 | Dillon | H04W 40/246 705/7.13 |
| 2015/0092789 A1* | 4/2015 | Li | H04W 56/00 370/437 |
| 2015/0134954 A1* | 5/2015 | Walley | H04L 63/08 713/168 |
| 2015/0147067 A1* | 5/2015 | Ryan | H04B 10/116 398/118 |
| 2015/0271745 A1* | 9/2015 | Knowles | H04W 8/24 370/254 |

FOREIGN PATENT DOCUMENTS

| | | |
|---|---|---|
| CN | 101621747 A | 1/2010 |
| CN | 101657997 A | 2/2010 |
| CN | 101919208 A | 12/2010 |
| CN | 103209467 A | 7/2013 |
| CN | 103476083 A | 12/2013 |
| CN | 107852661 A | 3/2018 |
| EP | 3298710 A1 | 3/2018 |
| EP | 3298710 B1 | 2/2020 |
| JP | 6698702 B2 | 5/2020 |
| WO | WO-2016191197 A1 | 12/2016 |

OTHER PUBLICATIONS

"International Application Serial No. PCT/US2016/033266, International Preliminary Report on Patentability dated Dec. 7, 2017", 12 pgs.

"Chinese Application Serial No. 201680043144.2, Office Action dated Aug. 7, 2020", w/ English Translation, 13 pgs.

"Chinese Application Serial No. 201680043144.2, Response filed May 10, 2021 to Office Action dated Mar. 2, 2021", w/ English claims, 49 pgs.

"European Application Serial No. 16800516.3, Extended European Search Report dated Dec. 14, 2018", 7 pgs.

"European Application Serial No. 16800516.3, Response filed Jul. 10, 2018 to Communication pursuant to Rules 161(2) and 162 EPC dated Jan. 8, 2018", 13 pgs.

* cited by examiner

Regular Data Packet

Regular Join Packet

Blink-Mode Data Packet

Alternative Blink-Mode Data Packet

LOW POWER SENSOR NODE OPERATION FOR WIRELESS NETWORK

CROSS-REFERENCE TO RELATED APPLICATION

This application claims the benefit of U.S. Provisional Application No. 62/165,873, filed on May 22, 2015 in the U.S. Patent and Trademark Office, the disclosure of which is incorporated by reference herein in its entirety.

BACKGROUND

Wireless mesh networks provide a high level of flexibility in network design and in the resulting range of applications that the networks can be used for. In the networks, nodes automatically detect and establish communications with neighboring nodes to form the wireless mesh. Network access points (APs) serve as gateways between the wireless mesh network and elements external to the mesh network. A network manager can coordinate the operation of the wireless mesh network, such as to coordinate the timing of the nodes and establish communication links between nodes.

In one example, nodes of a wireless mesh network each include a sensor and are operative to relay sensor data measurement through the network. In the example, a network access point provides an interface between the wireless mesh network and an external network (e.g., a local area network (LAN)), and enables a computer connected to the external network to receive the sensor data measurement from all of the wireless mesh network nodes.

Designers and manufacturers of wireless mesh network equipment have developed advanced wireless network nodes, access points, and network managers that are capable of providing a variety of network services. However, such wireless mesh networks operate with limited resources which commonly limit the number of nodes that can form part of a network, and limit the bandwidth available to each node in the network.

This disclosure details methods and systems that enable a mesh network to have a large number of nodes, and that enable nodes of the mesh network to operate in a very-low power consumption mode.

SUMMARY

The teachings herein alleviate one or more of the above noted problems with wireless mesh networks.

In accordance with one aspect of the disclosure, a mesh network system includes a plurality of network nodes and a network manager. The plurality of nodes includes a first subset of network nodes and a second subset of network nodes, each network node including a processor and a wireless transceiver configured for wireless communication with other nodes of the plurality of network nodes. The network manager is communicatively connected to the plurality of network nodes and is configured to manage operation of a wireless mesh network including nodes of the plurality of network nodes. The network manager is configured to allocate bandwidth of the wireless mesh network to each of the first subset of network nodes, wherein the allocated bandwidth includes a first bandwidth allocation for receiving and transmitting data packets along communication links of the wireless mesh network between the network nodes of the first subset, and a second bandwidth allocation for receiving network joining messages in network nodes of the first subset from network nodes of the second subset. The network manager is configured to, upon receiving a message transmitted from a network node of the second subset to a network node of the first subset using bandwidth of the second bandwidth allocation, identify the received message as a data message and provide data from the message to a host application.

The network manager can be further configured to perform functions to: upon receiving another message transmitted from another network node of the second subset to a network node of the first subset using bandwidth of the second bandwidth allocation, identify the received message as a network joining message and join the other network node having transmitted the network joining message to the wireless mesh network, wherein joining of the other node to the wireless mesh network can include allocating bandwidth of the wireless mesh network to the other network node, including a bandwidth allocation for receiving and transmitting data packets along communication links of the wireless mesh network between the other network node and nodes of the first subset, and a bandwidth allocation for receiving network joining messages in the other network node from network nodes of the second subset.

The function to allocate bandwidth can include allocating combinations of timeslots and communication channels to each network node of the first subset of network nodes including, for each respective network node of the first subset, a first combination of timeslots and channels for receiving and transmitting data packets between the respective network node and other network nodes of the first subset, and a second combination of at least one timeslot and at least one channel for receiving network joining messages in the respective network node from network nodes of the second subset.

The network manager can be configured to identify each received message transmitted to the first subset of network nodes using bandwidth of the second bandwidth allocation as a data message or as a network joining message based on a flag included in the received message.

The network manager can be configured to perform a further function to: upon receiving a packet data message generated in a network node of the first subset and transmitted through the wireless mesh network using bandwidth of the first bandwidth allocation, provide data from the packet data message to the host application.

The network node having transmitted the data message may not be joined to the wireless mesh network.

Each respective network node of the first subset may be configured to perform functions to: listen for packets transmitted from other nodes of the first subset to the respective network node, and transmit packets to other nodes of the first subset, during timeslots and on channels associated with the first bandwidth allocation; and listen for packets transmitted from nodes of the second subset to the respective network node during timeslots and on channels associated with the second bandwidth allocation. In one example, each respective network node of the first subset may be configured to perform further functions to: receive sensing data from a sensor associated with the respective network node; and generate data packets including the received sensing data, and transmit the generated data packets to other nodes of the first subset during timeslots and on channels associated with the first bandwidth allocation. In another example, each respective network node of the first subset is configured to perform further functions to: receive a packet transmitted from a node of the second subset to the respective network node during a timeslot and on a channel associated with the second bandwidth allocation; and transmit the packet received from the node of the second subset to another node of the first subset during a timeslot and on a channel associated with the first bandwidth allocation.

Each respective network node of the second subset may be configured to perform functions to: generate a data packet; listen for network advertisements transmitted from nodes of the first subset; upon receiving a network advertisement from one node of the first subset, transmit the generated data packet to the one node during a timeslot and using a channel of the second bandwidth allocation of the one node. In one example, each respective network node of the second subset may further be configured to: listen for network advertisements transmitted from nodes of the first subset during a predetermined amount of time, select one node from among nodes of the first subset from which network advertisements are received during the predetermined amount of time; and transmit the generated data packet to the selected one node during the timeslot and using the channel of the second bandwidth allocation of the selected one node. In the one example, the generated data packet may include sensor data and a list of nodes of the first subset from which network advertisements were received during the predetermined amount of time. In another example, each respective network node of the second subset may be configured to perform a further function to: upon receiving the network advertisement from the one node of the first subset, determine whether the network advertisement has a signal strength exceeding a predetermined threshold, wherein the generated data packet can be transmitted to the one node during the timeslot and using the channel of the second bandwidth allocation of the one node only upon determining that the network advertisement has the signal strength exceeding the predetermined threshold. In another example, each respective network node of the second subset may be configured to perform a further function to: receive sensing data from a sensor associated with the respective network node, wherein the function to generate the data packet can include generating a data packet including the received sensing data. In a further example, the received network advertisement may identify the timeslot and the channel of the second bandwidth allocation of the one node.

The first subset of network nodes may be network nodes operating in a canopy mode of operation, and the second subset of network nodes may be network nodes operating in a blink mode of operation.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to providing a very-low power consumption mode of operation for nodes in a wireless mesh network, and enabling a mesh network to receive and forward packets from a large number of nodes.

Wireless networks include pluralities of nodes, access points (APs), and other wireless network devices that are distributed in space and communicate wirelessly with each other. A network manager coordinates the operation of the wireless network devices to efficiently communicate with each other, and assigns bandwidth (e.g., channels and timeslot pairs) and network addresses (or other unique identifiers) to network nodes and APs to enable coordinated network communication.

The very-low power consumption mode presented herein, referred to as "blink" mode, allows a wireless network node (e.g., a sensor node, also referred to as a mote) to send a small amount of data into a pre-existing wireless mesh network with minimal energy use and without explicit bandwidth allocation. The wireless network node operating in the very-low power consumption "blink" mode may not have a network address assigned thereto.

Reference now is made in detail to the examples illustrated in the accompanying drawings and discussed below.

Figure 1:
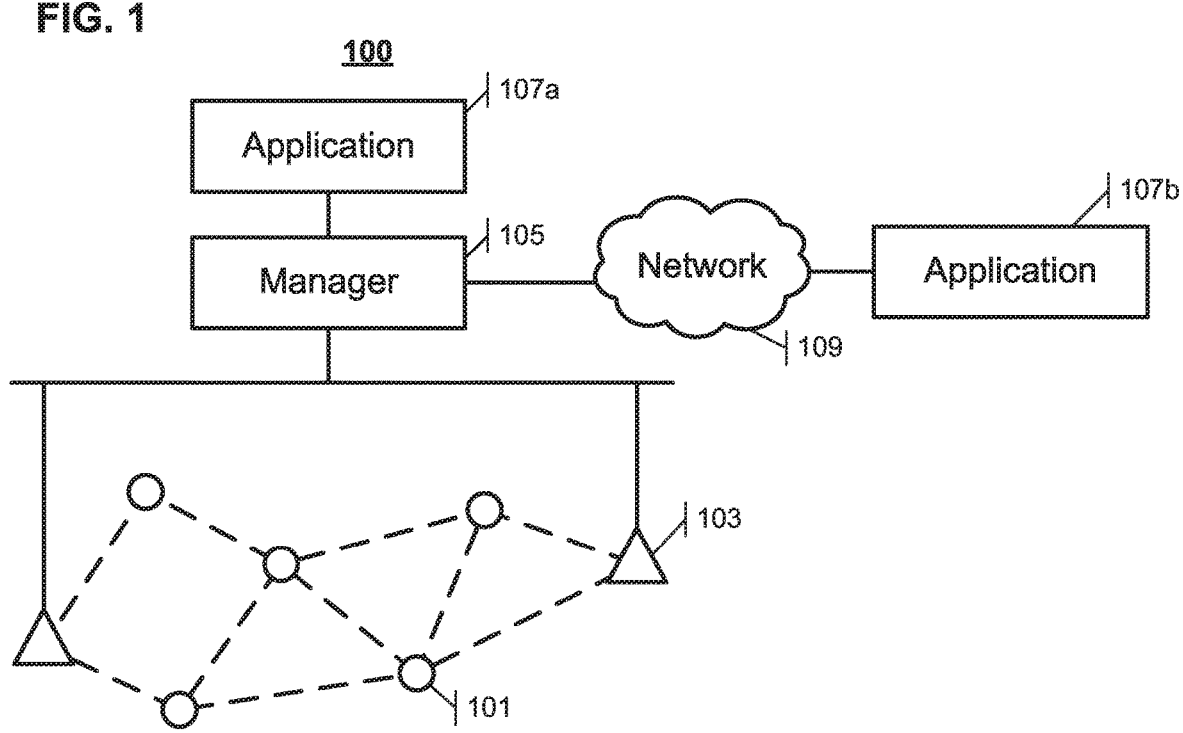
FIG. 1 is a high-level functional block diagram of an illustrative wireless mesh network.

FIG. 1 shows an example of a wireless mesh sensor network 100. The wireless mesh sensor network 100 enables the collection of sensor application data from multiple sense points or locations at which wireless sensor nodes 101 are located. The wireless mesh sensor network 100 establishes a multi-hop communication link mesh between the wireless sensor nodes 101 using the wireless sensor nodes 101 and access points 103 of the network.

Data sent from distant sensor nodes 101 is automatically routed through the mesh by having each node 101 or access point 103 transmit its packets topologically closer to the destination, and retransmit packets received from other nodes 101 or access points 103 closer to the destination. Each transmission and reception of a packet is called a hop, and in general different data packets will take different multi-hop routes through the mesh network. Typically, the multi-hop route taken by a packet (e.g., a data packet) through the mesh to its destination is dependent on stability of paths (e.g., stability of links between pairs of nodes and/or access points) in the wireless mesh network 100 and on the network's communication schedule (e.g., a communication schedule assigning bandwidth (timeslots and communication channels) to nodes and access points of the network and specifying each network node and access point's next communication opportunity).

By the process outlined above, packets can be communicated from a sensor node 101 to a destination (e.g., another sensor node 101, an access point 103, a network manager 105, or an application 107a/107b) or in the opposite direction to a sensor node 101 (e.g., from an application 107a/107b or the network manager 105). For example, sensor data may be collected in sensor nodes 101 and transmitted through the wireless mesh network 100 in packets originating in sensor nodes 101. Additionally, sensor application data (or other types of data) can be sent out towards the sensor nodes 101 or access points 103 from, for example, a network manager 105 or another sensor node. In some embodiments, reception of each packet transmission is acknowledged at each hop through the network to create an extremely reliable end to end system, typically to 99.999% reliability. In such embodiments, each transmission of a packet between a transmitter and a receiver (e.g., between two nodes, between two access points, or between a node and an access point) includes transmission of the packet by the transmitter, reception of the packet by the receiver, and transmission of an acknowledgement of receipt of the packet from the receiver to the transmitter upon successful reception of the packet by the receiver. In such embodiments, if no acknowledgement of receipt is received by a transmitter, the transmitter may retransmit the packet on the same link (e.g., to the same receiver) or on a different link of the wireless mesh network 100 until an acknowledgement is received.

The wireless sensor network 100 includes a centralized network manager 105. The network manager 105 is responsible for controlling operation of the wireless mesh network 100. For example, the network manager 105 may establish and control network timing (e.g., by setting a network clock according to which all nodes in the network communicate with each other). The network manager 105 may also determine which devices (e.g., nodes and access points) can participate in the network by selectively joining nodes and access points to the network, assigning network addresses (or other unique identifiers (ID)) to the joined devices, and setting the communication schedule for the network by assigning bandwidth to different devices of the network. The communication schedule may assign pairs of timeslots and channels to the devices (e.g., wireless nodes 101 and APs 103) of the network, to thereby identify which device can communicate on each channel during each timeslot of the network clock. Additionally, the communication schedule may assign pairs of timeslots and channels that form a "join listen" bandwidth during which wireless nodes 101 seeking to join the network can send network join messages, and during which wireless nodes 101 already joined to the network listen for such network join messages. In this manner, the communication schedule includes bandwidth assigned to (or allocated for) wireless nodes that are joined to the wireless mesh network, and bandwidth assigned to (or allocated for) nodes that are not currently joined to the wireless mesh network.

The wireless mesh sensor network 100 also includes one or more Access Points (APs) 103 which are devices that bridge the wireless sensor network and a wired network (or other network) connected to the wireless sensor network 100. The APs 103 can receive packets wirelessly from the nodes 101 of the wireless network, and can send these received packets over a wired network to the manager 105. More generally, the APs 103 provide an interface between the wireless mesh sensor network 100 and an external network 109 that may be wired or wireless. As such, APs 103 may receive wireless packets from the wireless nodes 101 and send these packets to the manager 105 or various applications 107a and 107b over one or more other wired or wireless networks (e.g., 109) or other media (e.g., WiFi, cell phone, microwave, or other links used to connect APs 103 to each other or to the manager 105). The APs 103 may also receive packets from the manager 105 or applications 107a and 107b, and forward these packets through the wireless mesh network 100 to destination wireless nodes 101. Note that while the network 109 is shown in FIG. 1 as being communicatively connected to the APs 103 through the network manager 105, the network 109 may alternatively be communicatively connected to the APs 103 through a direct or indirect path that may not include the network manager 105.

In order to reduce power consumption and extend battery life, each wireless sensor node 101 operates in an "awake" mode of operation only as much as required. When a wireless sensor node 101 is first powered on, the sensor node searches for a network to join by listening for network advertisements from other nodes or access points located in its vicinity. If the wireless sensor node 101 hears one or more network advertisements, the sensor node creates and sends a network joining packet in response to one of the network advertisements and undergoes a security handshake to be added or joined to the wireless mesh network corresponding to the one network advertisement. This process is commonly called "joining" the wireless mesh network in many systems, such as systems operating according to the WirelessHART network standard.

In further detail, the first part of the joining process involves the wireless sensor node 101 listening for network advertisements from the existing mesh network; this "synch" stage typically results in much higher average power consumption in the wireless sensor node 101 than normal operation. Once joined to the wireless mesh network, a wireless sensor node notifies the attached sensor and starts to accept sensor data. The wireless sensor node 101 generates packets with this sensor data as payload, and transmits the packets to a neighboring node 101 or access point 103 to allow the packets to be routed through the wireless sensor network 100 to a destination.

As part of the network joining process, the manager 105 allocates to each wireless sensor node 101 and access point 103 a fraction of the overall network bandwidth (e.g., one or more timeslot and channel pairs) and a fraction of the manager's memory. Once joined to the network by the manager 105, the wireless sensor node 101 may alternate between "awake" and "sleep" (or "standby") modes of operation based on the network bandwidth allocation of the manager 105. For example, the sensor node may operate in the "awake" mode of operation during timeslots of the network bandwidth allocation during which the sensor node 101 can send or receive packets, and operate in the "sleep" (or "standby") mode of operation during the remaining timeslots. In one example, the wireless sensor node 101 may send packets and receive acknowledgements on the order of 8 times per minute to stay synchronized to the network.

The description of FIG. 1 above has focused on the wireless sensor network 100 including wireless sensor nodes 101 operating in three different modes of operation: a "joining" mode of operation under which the sensor node operates during a network joining process, and "sleep" and "awake" modes of operation under which the sensor node operates once it is joined to the network.

Figure 2:
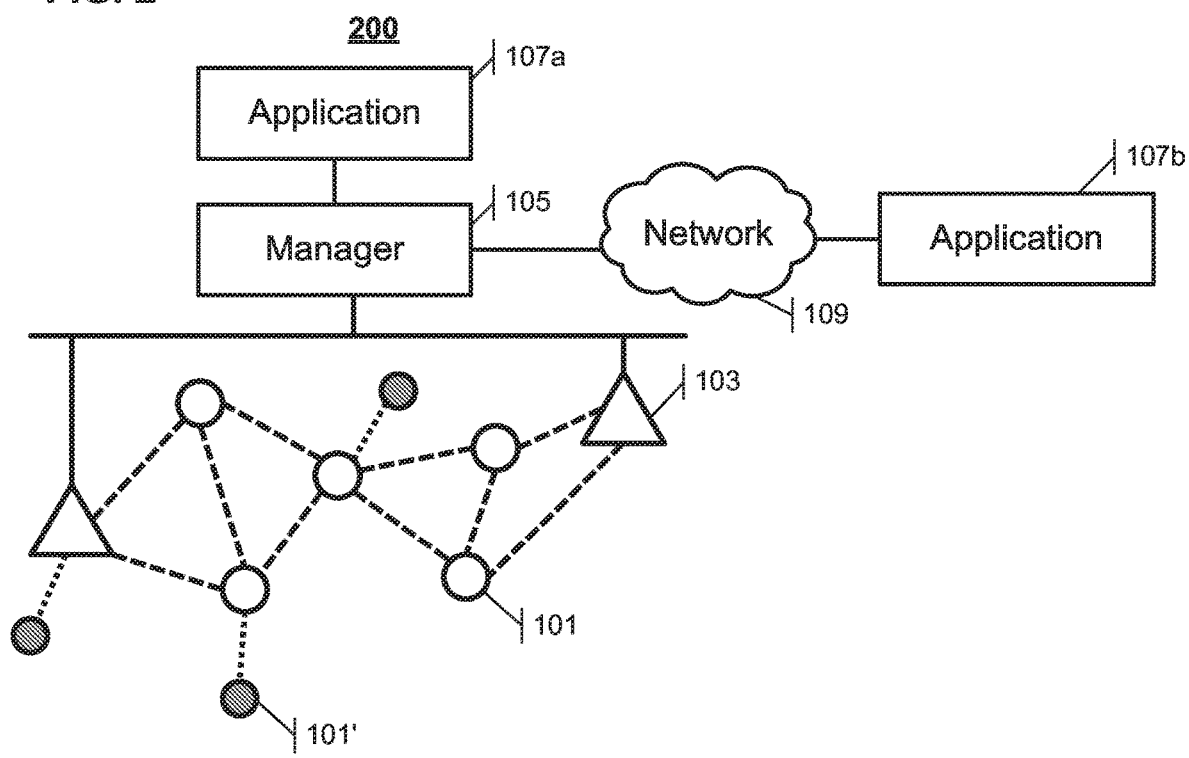
FIG. 2 is a high-level functional block diagram of an illustrative wireless mesh network including wireless mesh network nodes operating in the "blink" mode of operation.

FIG. 2 shows an example of another wireless sensor network 200 in which sensor nodes can operate under an additional mode of operation. In FIG. 2, wireless sensor nodes 101' can operate in an alternative "blink" mode of operation instead of joining the wireless mesh network. The wireless sensor nodes 101' generally include the same hardware as regular wireless sensor nodes 101, but are configured to operate under the alternative "blink" operational mode. For this purpose, the wireless sensor nodes 101' may have a different (or additional) software for configuring the nodes to operate in the "blink" mode.

Similarly to a wireless sensor node operating in the "joining" mode, when the wireless sensor node 101' operating in the "blink" mode is powered up, the wireless sensor node 101' listens for advertisements from wireless network(s) in its vicinity. In one example, the wireless sensor node 101' may have previously been configured to connect to a particular wireless network, and in such an example the sensor node 101' may listen for network advertisements having the Network ID of the particular wireless network. In other examples, the sensor node 101' may listen for a predetermined amount of time for any network advertisement(s) received during the predetermined amount of time, or the sensor node 101' may listen only until a first network advertisement is received (e.g., a first advertisement having a signal strength above a threshold, in some embodiments).

Once the sensor node 101' hears an acceptable advertisement (e.g., an advertisement having the correct Network ID in one example, an advertisement with signal strength above a threshold in another example) from a neighboring "advertising parent" node or access point, or once the predetermined amount of time has expired and at least one acceptable advertisement has been received (e.g., in another example), the wireless sensor node 101' transmits a data packet (referred to as a blink-mode data packet) to the advertising parent node.

In detail, the blink-mode data packet is transmitted by the wireless sensor node 101' instead of sending a join packet, as would generally be done by a wireless sensor node 101 operating in the "joining" mode of operation. The blink-mode data packet transmitted by the wireless sensor node 101' is a packet having a different content than a join packet, as discussed in further detail below. Upon receipt of the blink-mode data packet from the sensor node 101', the advertising parent node forwards the blink-mode data packet to another neighboring node or AP for transmission through the wireless mesh network just like a normal join packet would be forwarded through the wireless mesh network. Similarly to a join packet, the blink-mode data packet is forwarded through the wireless mesh network until it eventually arrives at the network manager 105.

Upon receipt of the blink-mode data packet, the network manager 105 recognizes the data packet as a blink-mode data packet and passes a notification to a connected host application 107a or 107b including the data contained in the blink-mode data packet. Note that the application(s) 107a and/or 107b execute on one or more servers including a processor, memory, and network communication interface. In general, in response to receiving a blink-mode data packet, no further action is taken by the manager 105 other than to forward the data to the application 107a/107b since the wireless sensor node 101' operating in the low-power "blink" mode will not be joined to the network (e.g., the low-power "blink" mode will generally not be assigned a network address or network bandwidth).

Meanwhile, as soon as the wireless sensor node 101' receives a link-layer acknowledgement from the advertising parent node confirming receipt of the blink-mode data packet by the advertising parent node, the sensor node 101' can power down and wait until the next time that data is generated and needs to be transmitted through the network. For example, the wireless sensor node 101' operating in the "blink" mode of operation may wait on the order of 1 hour to 1 day until its next transmission of another blink-mode data packet. Note that similarly to other packets transmitted through the mesh network, the blink-mode data packet is generally acknowledged through a link-layer process over all hops through the wireless mesh network as it is forwarded from the advertising parent to an AP 103 connected to the network manager 105.

As shown in FIG. 2, the mesh network 200 includes both wireless sensor nodes 101 (shown as empty circles) operating as described in relation to FIG. 1 above and wireless sensor nodes 101' (shown as grey circles) operating in the low-power "blink" mode as described in the previous paragraphs. In this manner, the mesh network provides a "canopy" of wireless sensor nodes 101 that are regularly joined to the mesh network through persistent wireless links (shown in dashed lines). The canopy supports the transmission of blink-mode data packet traffic (as well as join packet traffic, regular data packet traffic, and all other packet traffic) through the network between wireless network nodes 101 and APs 103 and to the network manager 105. Meanwhile, the wireless sensor nodes 101' operating in blink mode are connected through temporary wireless links (shown in dotted lines) that are only activated when the corresponding wireless sensor node 101' is awake, and data packets from wireless sensor nodes 101' are transmitted a single hop on one of the temporary wireless links before following persistent wireless links through the network to their destination (e.g., to the manager 105). Note that sensors can be connected or attached to both wireless sensor nodes 101, wireless sensor nodes 101', and APs 103.

In this manner, a network manager 105 that may normally be limited to supporting a maximum of around 100 wireless sensor nodes 101 concurrently joined to the wireless network can instead support tens of thousands of low-data wireless sensor nodes 101' operating in the blink mode. In detail, while a manager 105 may be limited in the number of wireless sensor nodes 101 that can be joined to a mesh network by limits on the number of unique addresses that can be assigned in the network and/or by limits on the available bandwidth available for communication through the network, the manager 105 can support a much larger number of wireless sensor nodes 101' operating in the "blink" mode since such nodes do not have addresses or bandwidth assigned to them.

Furthermore, low-data wireless sensor nodes 101' operating in blink mode can have an average current consumption that is an order of magnitude less than regular wireless sensor nodes 101 that join and remain in the network. Nonetheless, the wireless sensor nodes 101' operating in blink mode maintain the same data delivery reliability as is provided by the network to fully connected/joined sensor nodes 101. Additionally, in situations in which a wireless sensor node 101' operating in blink mode is within range of multiple networks, the wireless sensor node 101' has the ability to select which network to send data into from among networks from which the sensor node 101' receives network advertisements. Further, since the wireless sensor node 101' operating in blink mode does not need to be joined to any network to transmit data packets through the network, the wireless sensor node 101' can send data through multiple different networks in its vicinity at the same time or sequentially in short succession without taking the time to join any network. In some examples, wireless sensor nodes 101' operating in the blink mode have average current consumption in the microampere range (e.g., 1-10 µA).

While FIG. 2 shows the wireless sensor nodes 101' operating in blink mode as each having a temporary wireless link established with a sensor node 101, the wireless sensor nodes 101' can have temporary wireless links established directly with APs 103. The wireless links established by the wireless sensor nodes 101' operating in blink mode are temporary to the extent that they do not form part of the set of permanent communication links of the mesh network, although the same temporary link may be used repeatedly by a sensor node 101' to send data to a neighboring sensor node 101. These temporary wireless links do not necessarily have network bandwidth assigned to them, but instead make use of the shared network bandwidth (e.g., timeslot and channel pairs) that is devoted to receiving join packets from sensor nodes seeking to join the network.

In one most basic illustrative implementation, a sensor node 101' operating in blink mode may only ever send a single blink-mode data packet containing its unique identifier and payload, and using very little of the shared network bandwidth. In another illustrative example, for example in 802.15.4e-compliant networks, the payload per blink-mode data packet is approximately 80 Bytes. In further examples, in a 2 Mbps radio network, the payload per blink-mode data packet is approximately 1 kB.

FIGS. 3A-3D illustratively show illustrative structures of packets used in the wireless mesh network 200 of FIG. 2. FIGS. 3A-3D show four different illustrative packet structures corresponding to regular data packets transmitted by sensor nodes 101 having joined the network, regular join packets transmitted by sensor nodes 101 during the joining process, and blink-mode data packets transmitted by wireless sensor nodes 101' operating in blink mode.

Figure 3A:
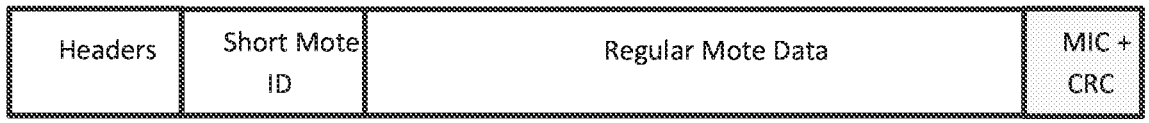
FIGS. 3A-3D are high-level diagrams showing illustrative structures of packets used in the wireless mesh network system of FIG. 2.

As shown in FIG. 3A, the regular data packet includes the following fields: a field for one or more headers, a field for a short sensor node (i.e., a mote) address or other identifier (ID), a field for data such as sensor data, and a field for message integrity check (MIC) or cyclic redundancy check (CRC) codes.

Figure 3B:
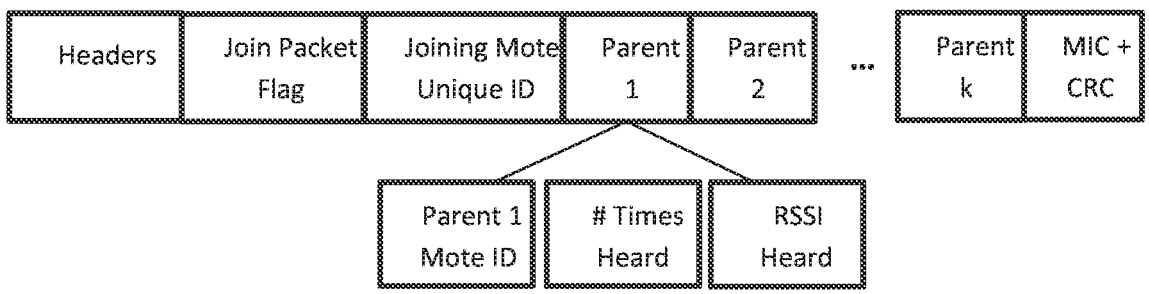

The regular join packet shown in FIG. 3B includes the following fields: a field for one or more headers, a field for a join packet flag identifying the packet as a join packet, a field for a unique identifier (ID) of the joining sensor node (i.e., a mote), one or more fields each identifying a respective potential parent node from which an advertisement packet was received, and a field for message integrity check (MIC) or cyclic redundancy check (CRC) codes. Note that each field identifying a respective parent node can include a sub-field for the address or other identifier (ID) of the respective parent node, a sub-field including a count of the number of advertisements received from the respective parent node, and a sub-field for including a received signal strength indicator (RSSI) indicative of measured strength of signals received from the respective parent node.

Figure 3C:
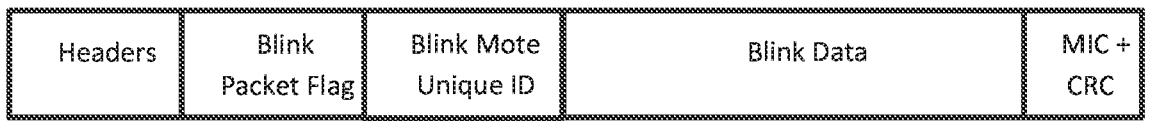

Finally, the blink-mode data packet shown in FIG. 3C has a structure generally similar to the packet structure of the regular join packet of FIG. 3B. However, unlike the regular join packet, the blink-mode data packet contains raw data (e.g., sensor data, or blink data) instead of a potential parent list. In detail, the blink-mode data packet includes the following fields: a field for one or more headers, a field for a blink-mode data packet flag identifying the packet as a blink-mode data packet, a field for a unique identifier (ID) of the sensor node (mote) operating in blink mode, a data field, and a field for message integrity check (MIC) or cyclic redundancy check (CRC) codes. Note that different keys may be used to calculate the MIC and/or CRC codes in the regular, join, and blink-mode data packets, although in some examples the same keys are used to calculate the MIC and/or CRC codes of the join and blink-mode data packets.

Figure 3D:
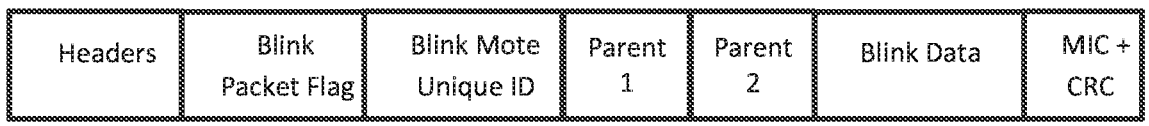

An alternative blink-mode data packet structure is shown in FIG. 3D. As shown in FIG. 3D, the blink-mode data packet can include a list of one or more nodes from which an advertisement packet was received, similarly to the field described in relation to FIG. 3B above.

As illustratively shown in FIGS. 3A-3D, all of the packet types used in the network can share a common/same/similar header structure. The regular data packets may be encrypted and authenticated according to a key specific to the sending sensor node 101, while the regular join packet and blink-mode data packet use a common/same join key for encryption and authentication. In some embodiments, the blink-mode data packet flag is the same as the join packet flag, and the manager 105 can distinguish between the two packet types by determining the omission of a potential parent list in the blink-mode data packet. In other embodiments, the blink-mode data packet flag is different from the join packet flag, but the two packet types are routed using identical routing processes through the mesh network. In some embodiments, the packet contents are encrypted and not inspected by forwarding nodes. In some embodiments, the manager 105 recognizes a blink-mode data packet by the unique identifier for the sensor node (Mote ID) provided by the originating sensor node 101' operating in blink mode and no special flag is required, for example by determining that the identifier is assigned to a sensor node 101' operating in blink mode.

The data field of the blink-mode data packet can include all application-related information. In some embodiments, the data field includes application-level security information for additional encryption and/or authentication. In some embodiments, a sequence number and/or a cryptographic nonce number is included to allow the host application to place into chronological (or other order) the blink-mode data packets that may be received out-of-order.

The foregoing description has focused on the wireless mesh networks 100 and 200, the function of the sensor nodes 101 and 101', and the structure of the communication packets. In addition, the network manager 105 is operative to process blink-mode data packets differently from both regular join packets and regular data packets, as detailed below. In a regular mesh network such as that shown in FIG. 1, two classes of packet are used: "command" packets are used for communication between the manager 105 and the sensor nodes 101 to build and maintain the network, and "data" packets are used for communication between the sensors (attached to the wireless sensor nodes 101) and the host application 107a or 107b. When a manager 105 receives a data packet originating at a sensor node 101, it strips away the headers and encryption and forwards the data to the host application 107a/107b for consumption.

A join packet received from a sensor node 101 seeking to form part of the mesh network canopy is a command packet, while a blink-mode data packet in the network of FIG. 2 is a data packet. The blink-mode data packet is unique in that it is the only data packet type that may be encrypted with the join key. In the manager 105, the blink-mode data packet is generally treated as a data packet, and the manager 105 thus strips away the headers and encryption and forwards the blink data to the host application 107a/107b for consumption.

Figure 5:
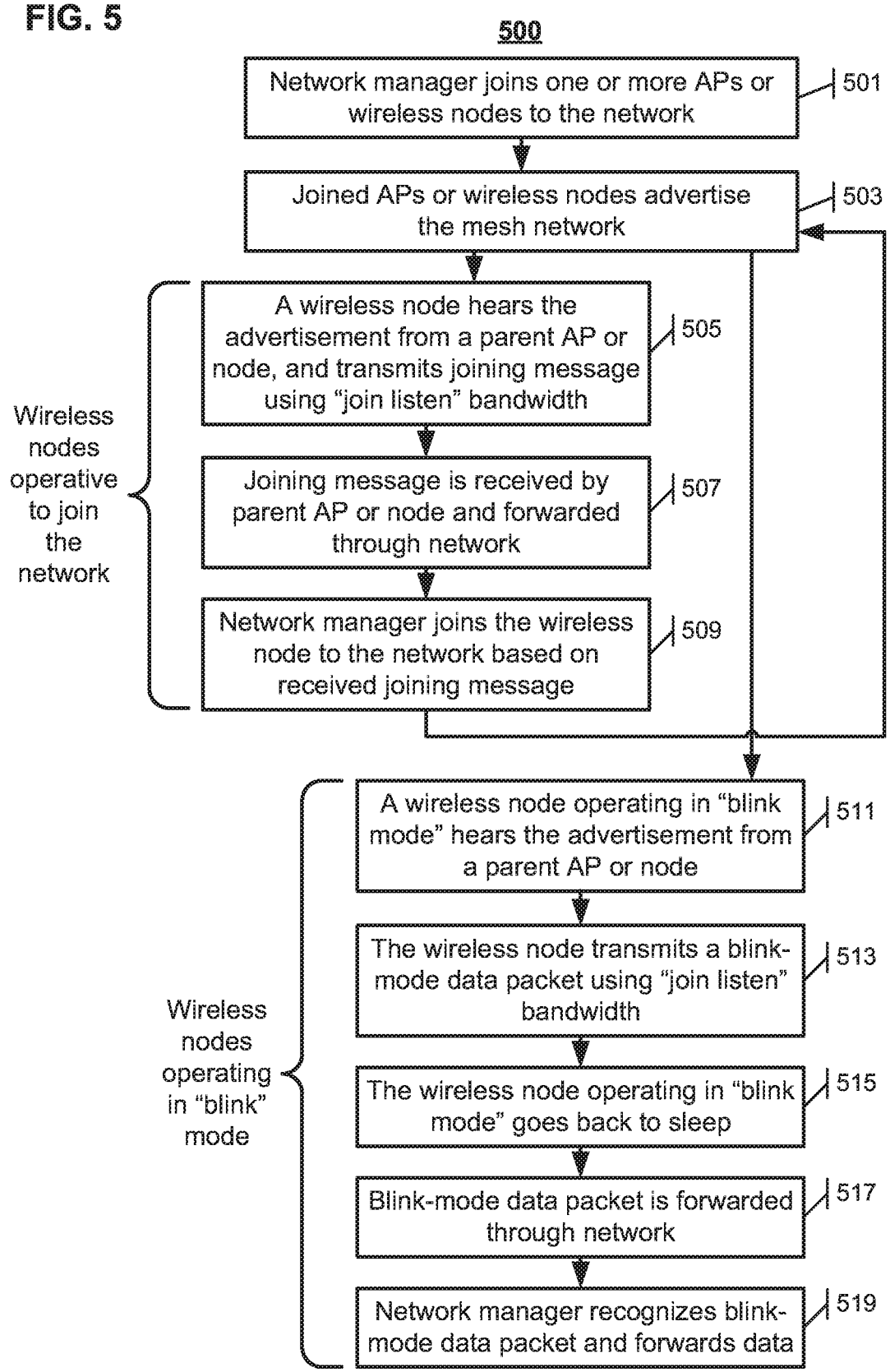
FIG. 5 is a high-level flow diagram showing steps of an example method illustrating the functioning of the wireless mesh network system of FIG. 2.

FIG. 5 shows an example method 500 illustrating the functioning of the wireless mesh network 200 of FIG. 2 that includes sensor nodes 101' operating in the blink mode is provided below.

The method 500 begins with an AP 103 transmitting a network join request to the manager 105 over a wired (or WiFi, etc.) network, and the network manager 105 joining the AP 103 to the wireless mesh network in step 501 and assigning to the AP 103 an identifier (ID) such as a network address.

The network manager 105 communicates the assigned ID along with an identifier for the network (network ID) to the AP 103, and the AP 103 starts to advertise the wireless mesh network by broadcasting wireless network advertisements including the network ID in step 503.

A sensor node 101 operating in the "joining" mode of operation hears an advertisement from the AP 103 or from another network sensor node 101 already joined to the wireless mesh network in step 505, and listens for more advertisements from other potential parent nodes (e.g., parent nodes from other networks, or from the same network as the AP) over a predetermined period of time (e.g., the next few seconds). After the predetermined period has elapsed or a timeout is reached, the sensor node 101 selects one parent (e.g., the "best" parent, as identified according to a selected metric) from among all nodes or APs from which advertisements were received, and sends a join request packet or message to this selected parent using the shared "join listen" bandwidth of the selected parent. The "join listen" bandwidth is a channel and timeslot assigned to the selected parent and used by the selected parent to listen for join packets from nodes seeking to join the wireless mesh network. Note that the sensor node 101 may synchronize its local clock to the timing of the network advertisement received from the selected parent node in order to synchronize itself to network time.

The join request packet or message is received by the selected parent in step 507, and forwarded by the parent through the wireless mesh network until it reaches an AP 103, and is forwarded by the AP 103 to the network manager 105.

In turn, in step 509, the network manager 105 recognizes the join request packet or message as a join packet, and determines whether the sensor node 101 having transmitted the packet or message should be joined or added to the wireless mesh network. If the network manager 105 determines that the sensor node 101 should be joined or added to the network, the network manager 105 assigns a network address (or short network ID) and network bandwidth to the sensor node 101 and sends a join response packet through the AP 103 and through the wireless mesh to the joining sensor node 101. The join response packet includes identification of the assigned network address (or short network ID) and the assigned network bandwidth for the joining sensor node 101.

Upon receiving the join response packet, the joining handshake is completed and the joining sensor node 101 is joined to the mesh network as a canopy node. The joined sensor node 101 has dedicated bandwidth (e.g., links having associated timeslot(s) and channel(s)) assigned for use in communicating to and from the node 101 across the wireless mesh network. Once joined to the network, the sensor node 101 does not make active use of the shared "join listen" bandwidth other than to listen for join packets and blink-mode data packets from other nodes.

Typically, five to six packets are exchanged between a sensor node 101 and the manager 105 as part of joining process before the sensor node 101 can send any data through the wireless sensor network to the host application 107a/107b. The packets are used by the manager 105 to provide the sensor node 101 with information including a unique identifier for the joining sensor node 101 to use in communications over the wireless sensor network and identification of bandwidth for use by the joining sensor node (e.g., the identification of bandwidth may include identification of channels and timeslots for use by the joining sensor node 101 to receive and transmit communications over the network).

Meanwhile, a sensor node 101' operating in the low-power "blink" mode of operation hears an advertisement from the AP 103 or another potential parent sensor network node 101 forming part of the wireless mesh network's canopy in step 511. In one example, upon hearing a network advertisement, the sensor node 101' immediately selects or chooses the advertising device as its parent if the received advertisement meets a pre-established signal quality threshold. In another example, the sensor node 101' listens for more advertisements from other potential parent nodes (e.g., parent nodes from other networks, or from the same network as the potential parent node from which the first advertisement was received) over a predetermined period of time (e.g., the next few seconds), and selects one parent (e.g., the "best" parent, as identified according to a selected metric) from among all nodes or APs from which advertisements were received during the predetermined time period. Note that the sensor node 101' may synchronize its local clock to the timing of the network advertisement received from the selected parent node in order to synchronize itself to network time, and may use the synchronized clock to determine the timing for waking up from low power sleep during subsequent operation.

When the selected parent node's join listen bandwidth (or communication opportunity) next comes up, the sensor node 101' operating in the blink mode sends a blink-mode data packet to the selected parent node 101 or AP 103 in step 513. In response to transmitting the blink-mode data packet, if the blink-mode data packet is acknowledged at the link layer, the sensor node 101' having transmitted the blink-mode data packet knows that the selected parent node 101 successfully received the blink-mode data packet and the sensor node 101' operating in blink-mode can therefore immediately go back to sleep to save power in step 515. Meanwhile, the blink-mode data packet is forward through the wireless mesh network in step 517 until it reaches its destination. In general, the destination of the blink-mode data packet is the network manager 105 (e.g., the same destination as the join packets or messages). In turn, upon receiving the blink-mode data packet, the network manager 105 determines that the packet is a blink-mode data packet in step 519, retrieves the data (e.g., sensor data or other blink data) contained in the packet, and forwards the data to the application 107a/107b.

Since the canopy of nodes provided by the wireless mesh sensor network is reliable, once the selected parent sensor node of the canopy has a copy of the blink-mode data packet, there is a greater than 99.999% chance that the manager 105 will receive the blink-mode data packet. As a result, there is generally no reason for the manager 105 to send an end-to-end acknowledgement to the sensor node 101' operating in the blink mode, and there is therefore no need for the sensor node 101' operating in the blink mode to remain active in order to receive such an end-to-end acknowledgement. As such, the sensor node 101' operating in the blink mode can go to sleep immediately after receiving the link layer acknowledgement of receipt of the blink-mode data packet from the selected parent, so as to save power.

If the blink-mode data packet is not acknowledged by the selected parent, the sensor node 101' operating in the blink mode generally follows a standard backoff and can try to resend the blink-mode data packet a few more times during subsequent join listen communication opportunities before resetting and listening again for a network advertisement from a different parent node. Alternatively or additionally, the sensor node 101' operating in the blink mode can select an alternative parent node from among the potential parent nodes from which network advertisements were received, and can transmit the blink-mode data packet to the selected alternative parent node.

Figure 4A:
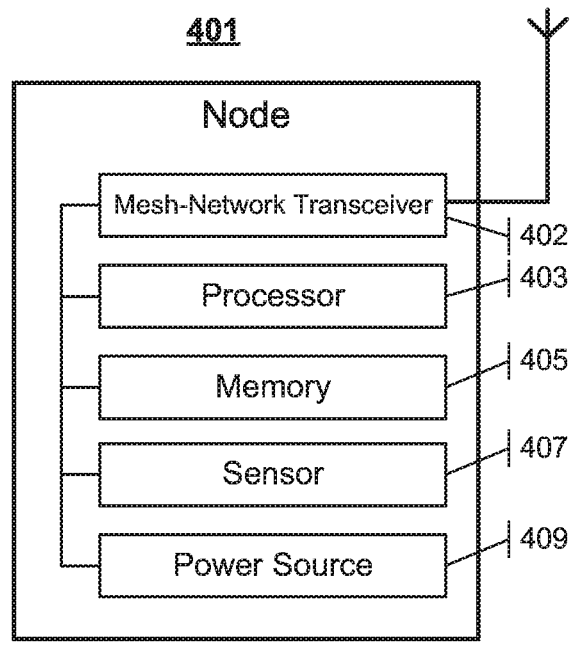
FIGS. 4A-4C are high-level functional block diagrams of an illustrative wireless node, an illustrative access point, and an illustrative network manager such as may be used in the wireless mesh network systems of FIGS. 1 and 2.
Figure 4B:
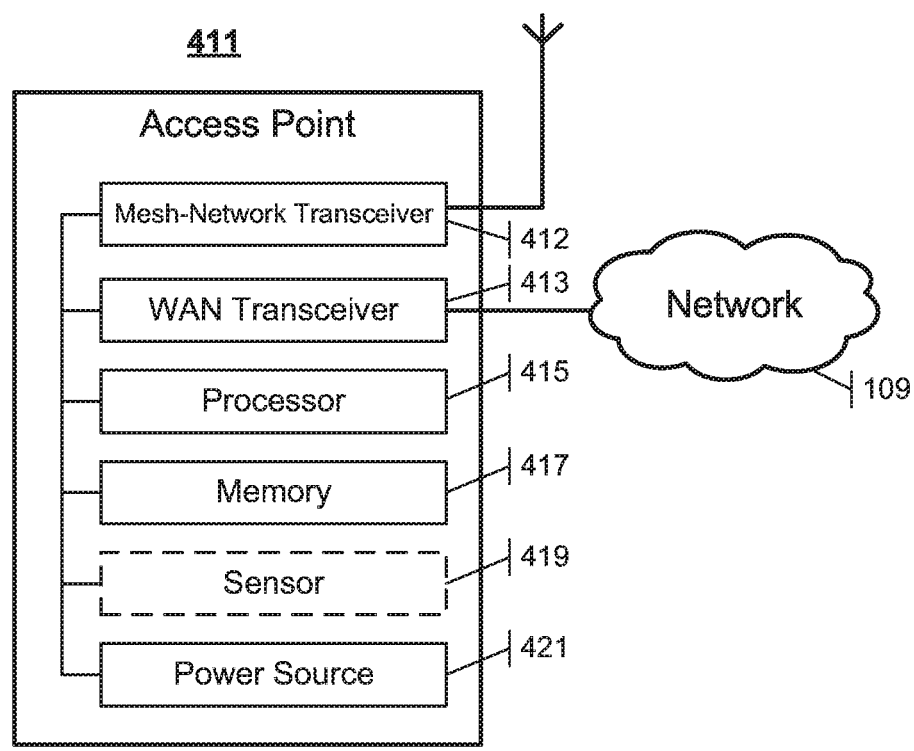
Figure 4C:
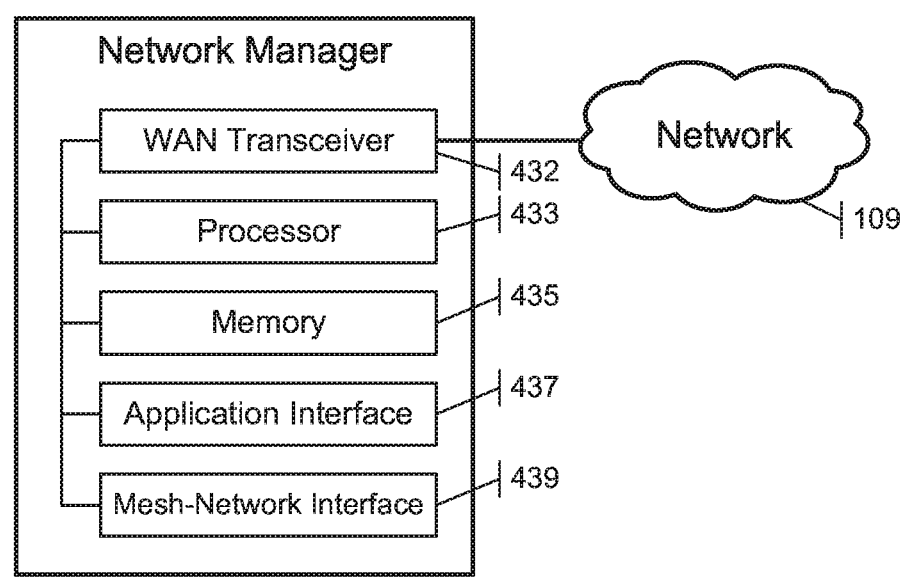

FIGS. 4A-4C show high-level functional block diagrams of illustrative components or devices of the wireless mesh network systems of FIGS. 1 and 2. FIG. 4A shows an example of a node 401 such as a node 101 or 101' used in the network systems 100 and 200 of FIGS. 1 and 2. The node 401 includes a processor 403 (e.g., a microprocessor) and a memory 405 that provide processing capabilities. The memory 405 stores application programs and instructions for controlling operation of the node 401, and the processor 403 is configured to execute the application programs and instructions stored in the memory 405. A power source 409, such as a battery, transformer, solar cell(s), dynamo, or the like, provides electric power for powering the operation of the node 401.

Additionally, the node 401 can include a sensor 407 producing sensing or measurement data that is provided to the processor 403 and/or stored in memory 405. The node 401 can additionally or alternatively include an actuator (e.g., a motor, valve, or the like) or other operational output (e.g., a display) that is controlled by the processor 403. The node 401 further includes a transceiver 402 that enables communication across the network (e.g., a wireless mesh-network) with other nodes 101 or APs 103. As shown in FIG. 4A, the transceiver 401 is a wireless transceiver 401 connected to an antenna and configured for wireless communication; in other embodiments, the transceiver 401 may be a wired transceiver. The various components of the node 401 are communicatively connected to each other (e.g., via a bus or other communication lines), and are electrically connected to the power source 409 to receive operating power.

As described above, the memory 405 can store instructions for execution by the processor 403 to cause the node 401 to function as a regular wireless mesh node (e.g., a node 101), a wireless mesh mode operating in blink mode (e.g., a node 101'), or a wireless mesh mode configured for operation in a selected one of a regular mode and a blink mode.

FIG. 4B shows a high-level functional block diagram of an example of an AP 411 such as AP 103 used in the network systems 100 and 200 of FIGS. 1 and 2. The AP 411 includes components substantially similar to those of the node 401, including a mesh-network transceiver 412, a processor 415 (e.g., a microprocessor), a memory 417, an optional sensor 419, and a power source 421. Such components of the AP 411 are substantially similar to corresponding components of the node 401, and reference can be made to the description of the node 401 for detailed information on the components and their function. The AP 411 optionally includes a sensor 419, actuator, or other operational output that is controlled by the processor 415, similarly to the node 401.

Additionally, the AP 411 can include dual transceivers: a first transceiver 412 (e.g., a mesh-network transceiver) configured for communication with wireless nodes 101 of the wireless mesh network, and a second transceiver 413 (e.g., a WAN transceiver) configured for communication outside of the mesh-network such as communications with the network manager 105 or application(s) 107a/107b (e.g., via the network 109). In our example, the first transceiver 412 may be a wireless transceiver, while the second transceiver 413 may be a transceiver configured for wired communications (e.g., a transceiver compatible with Ethernet standards) directly with the network manager 105 or indirectly via one or more network(s) 109. While two transceivers are shown in FIG. 4B, some embodiments may include a single transceiver performing both communications functions, while in other embodiments communications with the network manager 105 may be via a direct wired link.

In both FIGS. 4A and 4B, the sensors 407 and 409 are shown as being located within the node 401 and AP 411. More generally, the sensors 407 and 409 may be external to the node 401 and AP 411, but may be connected to the node 401 and AP 411 so as to communicate sensor data to the node 401 and AP 411.

FIG. 4C shows a high-level functional block diagram of an example of a network manager 431 such as network manager 105 used in the network systems 100 and 200 of FIGS. 1 and 2. The network manager 431 controls operations of the mesh network, and serves as an interface between the network and the outside (e.g., as an interface between the network and external application(s) 107a/107b). Specifically, all communications between the mesh network and external applications 107a/107b may flow through the network manager 431, or otherwise be controlled by the network manager 431.

The network manager 105 is shown in FIG. 1 as being a separate entity from the AP 103, and as being physically separate from any AP 103. In such embodiments, the network manager 105 and AP(s) 103 are separate entities and may be communicatively connected via a communication cable (as shown), one or more wired or wireless network(s), and/or one or more wireless communication links. In other embodiments, the network manager 105 may be co-located with one AP 103, for example within a same device casing. In such embodiments, the network manager 105 and AP 103 may have distinct processors, may be mounted on distinct circuit boards, and may be communicatively connected by wire traces between the circuit boards. In further embodiments, the network manager 105 may execute on a same processor as an AP 103.

The network manager 431 includes a processor 433 (e.g., a microprocessor) and a memory 435 that provide processing capabilities. The memory 435 stores application programs and instructions for controlling operation of the network manager 431, and the processor 433 is configured to execute the application programs and instructions stored in the memory 435 and control operation of the manager 431.

Additionally, the network manager 431 includes a communication interface such as a transceiver 432 for communication via network(s) 109. While a single transceiver 432 is shown in FIG. 4C, the network manager 431 can include multiple transceivers, for example in situations in which the network manager 431 communicates using different communications standards or protocols, or using different networks or communications links, with the AP(s) 103 and/or the application(s) 107a/107b. For instance, a dedicated communication interface 439 (e.g., a dedicated port) can be included for communication with the AP(s) 103 of the mesh network. As shown in FIG. 4C, the transceiver 432 is a wired transceiver connected to network 109; in other embodiments, the network manager 431 includes one or more wireless transceivers connected to antennas and configured for wireless communication.

The various components of the network manager 431 are communicatively connected to each other (e.g., via a bus or other communication lines), and are electrically connected to a power source to receive operating power.

The network manager 431 provides oversight of the mesh network, and can control operation of the network. For example, the network manager 431 joins nodes to the network, sets network timing and/or sets a network communication schedule, and performs other network administration based on program instructions stored in memory 435 and executed on processor 433. In addition, as part of joining nodes and APs to the network, the network manager 431 can receive identification information from nodes 101 and AP(s) 103 and can authenticate the nodes and AP(s) based on the identification information.

The network manager 431 further functions as an operational gateway or interface between the mesh network and the outside—and in particular as an interface for application(s) 107a/107b interfacing with the mesh network AP(s) and/or nodes. For this purpose, the application interface 437 may be executed on processor 433. The application interface 437 can receive data and information from the network (e.g., from AP(s) 103, and/or from nodes 101/101' via the AP(s)), format or process the data to put it in a format useable by the application(s) 107a/107b, and provide the raw or processed data to the application(s) 107a/107b. In this regard, the network manager 431 and application interface 437 can receive data and information from nodes 101 operating as regular nodes and nodes 101' operating in blink mode, and can forward data received from such nodes to the application(s) 107a/107b. The application interface 437 can further receive data, information, or control information from the application(s) 107a/107b, format and process the data, information, or controls to put them in a format useable by the AP(s) and nodes, and provide the processed data, information, or controls to the AP(s) and nodes.

Additional optional features of the sensor nodes 101' operating in blink mode are detailed below in the following examples. In one example, the sensor attached to the sensor node operating in blink mode (and/or the sensor application controlling function of the sensor) may generate more data than the amount of data that can fit in a single blink-mode data packet. In this situation, after a first blink-mode data packet is sent and acknowledged at the link layer, the sensor node 101' operating in blink mode can send as many more blink-mode data packets as are needed to transmit all of the sensor data in the same manner as described above. In particular, all of the blink-mode data packets can be sent during a same join listen timeslot of the selected parent node or during several different (e.g., sequential) joint listen timeslots of the selected parent node (or of different parent nodes from which advertisements have been received). After all of the blink-mode data packets have been transmitted and been acknowledged by the respective selected parent node(s), the sensor node 101' operating in blink mode can go back to sleep. When multiple blink-mode data packets are being sent, a nonce or sequence number may be included as part of the data to avoid confusion and enable the packets to be ordered in the manager 105 or in the application 107a/107b if the blink-mode data packets are received out of order by the manager 105 and/or by the host application 107a/107b. Further, the multiple blink-mode data packets can be transmitted during a same/single "join listen" communication opportunity of the parent node, or the multiple blink-mode data packets can be transmitted over the course of multiple sequential "join listen" communication opportunities of the parent node.

As described above, the sensor nodes 101' operating in blink mode may be sensor nodes that are configured for operation in blink mode only. Alternatively, wireless network sensor nodes can be configured such that a single wireless network sensor node can selectively operate as a regular canopy sensor node 101 (configured to join the mesh network) and as a blink node 101'. Specifically, a sensor node may store in memory instructions for enabling the sensor node to operate in any of the operating modes described herein. The sensor node may select a mode to operate upon initial boot of the sensor node, or the sensor node may change operating mode in the course of operation. When operating as a sensor node configured to fully join the wireless mesh sensor network (e.g., as a wireless sensor node 101), a sensor node can receive downstream packets from the manager 105 and host application(s) 107a/107b. The sensor node can thus receive maintenance packets, software or firmware updates, or the like from the network manager 105 and host application 107a/107b. Because the mesh network protocol sometimes has an associated limit on the number of sensor nodes that can join the network (e.g., a sensor node limit of 100 nodes, as per this manager example, at any time), all of 50,000 sensor nodes operating in blink mode cannot be fully joined to the network at the same time. Instead, each sensor node operating in blink mode can be configured to generally operate in the blink mode, and to very infrequently do a full join so as to receive updates from a host application 107a/107b (for example, the sensor node operating in blink mode may join the network once per month). In the example, certain network sensor nodes may be configured to operate as canopy nodes at all times, to thereby provide a reliable mesh network coverage through which sensor nodes operating in blink mode can send packets to the AP 103 and network manager 105. The sensor nodes operating in blink mode may store information from one or more received network advertisements in local memory, and may use the stored information to send a join packet to a selected parent node when the sensor node is caused to join the network (e.g., one per month).

In some examples, a sensor node can be configured to partially join the wireless sensor network while maintaining full security credentials as a regular sensor node. In one example, sensor nodes operating in blink mode are connected to GPS sensors, and the GPS sensors need to hear downstream almanac data in order to synch quickly at low power. In this example, a sensor node operating in blink mode can send a partial join packet as its blink-mode data packet, and the manager can then be configured to send back to the sensor node operating in blink mode the broadcast session key without adding the sensor node to its list of joined nodes and without assigning any dedicated bandwidth for the sensor node. A partial join packet can have a structure similar to that of a join packet or a blink-mode data packet, but can be identified by using a different packet flag from both the blink-mode data packet flag and the join packet flag. In the example, the manager may be continuously broadcasting almanac data downstream through the canopy. Once the sensor node operating in blink mode receives the packet including the broadcast session key from the manager, the sensor node operating in blink mode is able to stay synched to the network by hearing the downstream broadcast. The sensor node operating in blink mode can send a blink-mode data packet upstream whenever it needs to send data to the network manager 105 by using the same shared bandwidth as before. In this model, the mesh network can still support tens of thousands of sensor nodes operating in blink mode, and the sensor nodes operating in blink mode can still consume lower power than regular sensor nodes since the sensor nodes operating in blink mode do not have to send packets through the mesh network to stay synched with the network.

A main contributor to both the average power consumption and the synchronization time for a sensor node operating in blink mode is the power and time used to search for the network advertisements. Both the average power consumption and the synchronization time increase approximately linearly with the number of channels used in the system. As such, by implementing a blacklist to reduce the number of channels used in the system (e.g., reducing from 15 channels to 7 channels), the speed at which a network advertisement can be received in a sensor node operating in the blink mode and the average power consumption can be reduced. However, if the manager sets the network to advertise on channels disjoint from those that the sensor node is listening to (e.g., if the network advertises only on the odd-numbered channels, and the sensor node listens only to the even-numbered channels), the sensor nodes may be unable to hear network advertisements and communicate across the network. Thus, to take advantage of channel blacklisting, both the manager and the sensor nodes need to agree on the channel list before the sensor node wakes up to listen to network advertisements. This can be implemented either by manually programming both the manager and the sensor node(s), or by having the sensor node(s) remember (or store in memory) the blacklist received (e.g., from advertisements) by the sensor node(s) the last time they joined a network. A failover operation can be implemented to cause the sensor nodes to switch to operate with no blacklist in the event that the sensor nodes do not hear advertisements in a previous attempt (or within a particular time interval).

In the implementation described above, the blink-mode data packet traffic uses the same shared bandwidth usually devoted to allowing regular join packets to be communicated from canopy nodes seeking to join the wireless sensor network. In an extreme case with substantial blink-mode data packet traffic, canopy sensor nodes could be configured to be prevented from joining or rejoining the network. In such an embodiment, separate advertisement links and shared receive bandwidth could be assigned to the canopy sensor nodes (e.g., receive bandwidth that is separate from the receive bandwidth allocated to sensor nodes operating in blink mode) to separate out the blink-mode data packet traffic from the canopy joining traffic and to thereby prevent these potential collisions between concurrent communications.

The foregoing description has focused on an illustrative implementation in which the blink-mode data packet traffic follows the mesh network to an AP 103. In general, the manager 105 could set up a blink-mode data packet forwarding graph in the wireless mesh network to route all blink-mode data packet traffic to a particular location which is not necessarily an AP 103 or manager 105. In such an example, canopy nodes are provided with the blink-mode data packet forwarding graph and are made to route blink-mode data packet traffic to the particular location. This implementation enables peer-to-peer blink-mode data packet traffic patterns.

In another example, a sensor node 101' operating in blink mode may be configured to send blink-mode data packets through multiple different networks. Any network using the same advertising and join keys can accept a packet from a sensor node 101' operating in blink mode. This enables a sensor node 101' operating in blink mode to serially send blink-mode data packets to multiple networks in its vicinity, or to travel to different locations and join (or send blink-mode data packets across) the local network without reconfiguration. In one application, a sensor node 101' operating in blink mode could be used as a remote control by a technician to deactivate all networks in the vicinity. The sensor node 101' operating in blink mode could execute an application to search for all networks in range and send a blink-mode data packet to each detected network as each network is discovered/detected.

In some examples, the sensor node operating in blink mode is equipped with a low-power crystal (e.g., a 1 µA crystal that is accurate to 10 ppm). Some mesh wireless sensor networks advertise on a deterministic schedule, so once the sensor node 101' operating in blink mode has connected to a network, the sensor node 101' can compute to within a good estimate (e.g., within 10 ms after 1000 seconds) when a later advertisement will come again for its next packet, and what channel this advertisement will be sent on. The sensor node 101' can further compute to within a good estimate when future join listen opportunities will occur during which blink-mode data packets can be sent. By using this information, the sensor node 101' could also help reduce the synch time and hence the average power consumption. If the anticipated advertisement does not arrive during the predicted window (e.g., a 10 ms window), the sensor node 101' may fail over to the standard implementation and may be configured to listen for future network advertisements over a longer predicted window.

The foregoing systems and methods present multiple advantages over current implementations of wireless mesh sensor networks. In particular, the foregoing systems and method leverage the join packet structure and the automatic forwarding of join packets through the network to send secure data; enable tradeoff between the amount of shared bandwidth allocated to canopy sensor nodes and the amount of blink-mode data packet traffic that can be supported; use an implicit or explicit flag to indicate to the manager that a blink-mode data packet should be passed directly to a connected host application; canopy sensor node code is untouched irrespective of whether a product supports or does not support blink mode operation; enable ultra-low power consumption for sensor nodes with minimal data requirements that operate in blink mode; enable a very large number of devices to participate in a network otherwise limited in size; enable reliable end-to-end data delivery at a significant power reduction as compared to fully joined devices (for example, as compared to a Zigbee network which does not provide the same level of reliability); provide the ability by the sensor nodes operating in blink mode to select the network with which to participate, as opposed to blindly sending data; provide the ability to use some level of security and/or a common join key; and provide the ability for sensor nodes operating in blink mode to send data to any network using the same security credentials.

As described above, the blink mode of operation allows a wireless mesh network node to send a small amount of data into a pre-existing mesh with minimal energy use and without explicit bandwidth allocation. The blink mode of operation enables increased network capacity (i.e. more devices sending periodic data), reduced blink sensor node average current consumption in low-data limit while maintaining reliability, seamless operation with existing HART-compatible and/or other mesh networks although small changes in operation of the network manager may be performed, existing join packets can be used to carry blink data, identical reliability of packet delivery as a fully connected network node, capability for occasional maintenance joining with a macroschedule, downstream session distribution and broadcast dissemination, data delivery by the manager to a host application can be licensed, and message security provided by secret advertising and join keys can be provided. As a guiding example, when considering a wireless mesh network which today can support up to one hundred wireless nodes, the blink mode of operation enables upwards of 50,000 sensor nodes operating in blink mode to be supported by this same network provided the blink motes send data only intermittently (e.g., once per hour).

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A network manager for managing communications between a plurality of network nodes in a wireless mesh network, the network manager comprising:
    a communication interface for communication with the plurality of network nodes; and
    a processor configured to execute application programs stored in memory to perform functions to:
    allocate, to each of a first subset of the plurality of network nodes joined to the wireless mesh network, a first bandwidth allocation for data communication among the first subset within the wireless mesh network and a second bandwidth allocation, different than the first bandwidth allocation, for receiving network messages from respective network nodes of a second subset of the plurality of network nodes not joined to the wireless mesh network;
    determine a message is transmitted from a first network node of the second subset to a second network node of the first subset using bandwidth of the second bandwidth allocation, the first network node of the second subset operating in a low power mode without a network address and without a bandwidth allocation for the wireless mesh network;
    in response to the determining, identify the message as a sensor data message that includes sensor data from a sensor of the first network node of the second subset and provide the sensor data of the sensor data message from the second node of the first subset to a host application; and
    upon receiving another message transmitted from another network node of the second subset to a network node of the first subset using bandwidth of the second bandwidth allocation, identify the received message as a network joining message and join the other network node having transmitted the network joining message to the wireless mesh network.

2. The network manager of claim 1, wherein the processor is further configured to control the network manager to perform functions to:
    join the other node to the wireless mesh network by allocating bandwidth of the wireless mesh network to the other network node, including a bandwidth allocation for receiving and transmitting data packets along communication links of the wireless mesh network between the other network node and nodes of the first subset, and a bandwidth allocation for receiving network joining messages in the other network node from network nodes of the second subset.

3. The network manager of claim 1, wherein the bandwidth comprises combinations of timeslots and communication channels allocated to each network node of the first subset of network nodes including, for each respective network node of the first subset, a first combination of timeslots and channels for receiving and transmitting data packets between the respective network node and other network nodes of the first subset, and a second combination of at least one timeslot and at least one channel for receiving network joining messages in the respective network node from network nodes of the second subset.

4. The network manager of claim 1, wherein the processor is configured to identify each received message transmitted to the first subset of network nodes using bandwidth of the second bandwidth allocation as a data message or as a network joining message based on a flag included in the received message.

5. The network manager of claim 1, wherein the processor is configured to control the network manager to perform a further function to:
upon receiving a packet data message generated in a network node of the first subset and transmitted through the wireless mesh network using bandwidth of the first bandwidth allocation, provide data from the packet data message to the host application.

6. A mesh network system comprising:
the network manager of claim 1; and
the plurality of network nodes in wireless communication with each other and including the first subset of network nodes joined to the wireless mesh network and the second subset of network nodes not joined to the wireless mesh network,
wherein each respective network node of the first subset is configured to perform functions to:
listen for packets transmitted from other nodes of the first subset to the respective network node, and transmit packets to other nodes of the first subset, during timeslots and on channels associated with the first bandwidth allocation; and
listen for packets transmitted from nodes of the second subset to the respective network node during timeslots and on channels associated with the second bandwidth allocation.

7. The mesh network system of claim 6, wherein each respective network node of the first subset is configured to perform further functions to:
receive sensing data from a sensor associated with the respective network node; and
generate data packets including the received sensing data, and transmit the generated data packets to other nodes of the first subset during timeslots and on channels associated with the first bandwidth allocation.

8. The mesh network system of claim 6, wherein each respective network node of the first subset is configured to perform further functions to:
receive a packet transmitted from a node of the second subset to the respective network node during a timeslot and on a channel associated with the second bandwidth allocation; and
transmit the packet received from the node of the second subset to another node of the first subset during a timeslot and on a channel associated with the first bandwidth allocation.

9. A mesh network system comprising:
the network manager of claim 1; and
the plurality of network nodes in wireless communication with each other and including the first subset of network nodes joined to the wireless mesh network and the second subset of network nodes not joined to the wireless mesh network,
wherein each respective network node of the second subset is configured to perform functions to:
generate a data packet;
listen for network advertisements transmitted from nodes of the first subset; and
upon receiving a network advertisement from one node of the first subset, transmit the generated data packet to the one node during a timeslot and using a channel of the second bandwidth allocation of the one node.

10. The mesh network system of claim 9, wherein each respective network node of the second subset is configured to:
listen for network advertisements transmitted from nodes of the first subset during a predetermined amount of time,
select one node from among nodes of the first subset from which network advertisements are received during the predetermined amount of time; and
transmit the generated data packet to the selected one node during the timeslot and using the channel of the second bandwidth allocation of the selected one node.

11. The mesh network system of claim 10, wherein the generated data packet includes sensor data and a list of nodes of the first subset from which network advertisements were received during the predetermined amount of time.

12. The mesh network system of claim 9, wherein each respective network node of the second subset is configured to perform a further function to:
upon receiving the network advertisement from the one node of the first subset, determine whether the network advertisement has a signal strength exceeding a predetermined threshold,
wherein the generated data packet is transmitted to the one node during the timeslot and using the channel of the second bandwidth allocation of the one node only upon determining that the network advertisement has the signal strength exceeding the predetermined threshold.

13. The mesh network system of claim 9, wherein each respective network node of the second subset is configured to perform a further function to:
receive sensing data from a sensor associated with the respective network node,
wherein the function to generate the data packet comprises generating a data packet including the received sensing data.

14. The mesh network system of claim 9, wherein the received network advertisement identifies the timeslot and the channel of the second bandwidth allocation of the one node.

15. The network manager of claim 1, wherein the first subset of network nodes are network nodes operating in a canopy mode of operation, and wherein the second subset of network nodes are network nodes operating in a blink mode of operation.

16. A method for managing communications between a plurality of network nodes in a wireless mesh network, a first subset of the plurality of network nodes being configured to receive and transmit data packets among the first subset according to a first bandwidth allocation, and being configured to receive network messages from respective network nodes of a second subset of the plurality of network nodes not joined to the wireless mesh network according to a second bandwidth allocation different from the first bandwidth allocation, the method comprising:

determining, by a network manager of the wireless mesh network, that a message is transmitted from a first network node of the second subset to a second network node of the first subset using bandwidth of the second bandwidth allocation, the first network node of the second subset operating in a low power mode without a network address and without a bandwidth allocation for the wireless mesh network;

in response to the determining, identifying the message as a sensor data message that includes sensor data from a sensor of the first network node of the second subset and providing the sensor data of the sensor data message from the second node of the first subset to a host application upon determining that the received message, transmitted from the first network node of the second subset of network nodes not joined to the wireless mesh network, is a sensor data message; and upon receiving in the network manager another message transmitted from another network node of the second subset to a network node of the first subset using bandwidth of the second bandwidth allocation, identifying the received message as a network joining message and joining the other network node having transmitted the network joining message to the wireless mesh network.

17. The method of claim 16,
wherein joining of the other node to the wireless mesh network comprises allocating bandwidth of the wireless mesh network to the other network node, including a bandwidth allocation for receiving and transmitting data packets along communication links of the wireless mesh network between the other network node and nodes of the first subset, and a bandwidth allocation for receiving network joining messages in the other network node from network nodes of the second subset.

18. The method of claim 16, wherein the network manager is operative to allocate the first and second bandwidth allocations to each include combinations of timeslots and communication channels allocated to each network node of the first subset including, for each respective network node of the first subset, the first bandwidth allocation including a first combination of timeslots and channels for receiving and transmitting data packets between the respective network node and other network nodes of the first subset, and the second bandwidth allocation including a second combination of at least one timeslot and at least one channel for receiving network joining messages in the respective network node from network nodes of the second subset.

19. The method of claim 16, further comprising:
upon receiving in the network manager a packet data message generated in a network node of the first subset and transmitted through the wireless mesh network using bandwidth of the first bandwidth allocation, providing data from the packet data message to the host application.

20. A network manager for managing communications between a plurality of network nodes in a wireless mesh network, a first subset of the plurality of network nodes being configured to receive and transmit data packets among the first subset according to a first bandwidth allocation, and being configured to receive network messages from respective network nodes of a second subset of network nodes not joined to the wireless mesh network according to a second bandwidth allocation different from the first bandwidth allocation, the network manager comprising:

means for determining a message is transmitted from a first network node of the second subset of network nodes to a second network node of the first subset of network nodes using bandwidth of the second bandwidth allocation, the first network node of the second subset operating in a low power mode without a network address and without a bandwidth allocation for the wireless mesh network;

means for identifying the message as a sensor data message that includes sensor data from a sensor of the first network node of the second subset and, in response to the determining, providing the sensor data of the sensor data message from the second node of the first subset to a host application; and means for receiving in the network manager another message transmitted from another network node of the second subset to a network node of the first subset using bandwidth of the second bandwidth allocation, identifying the received message as a network joining message and joining the other network node having transmitted the network joining message to the wireless mesh network.

* * * * *